Figure 1:
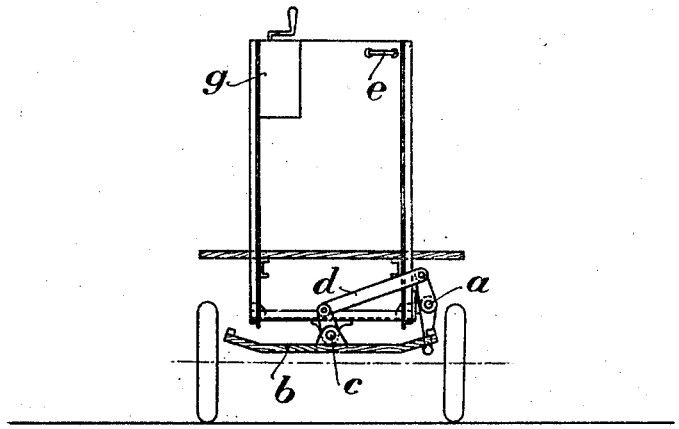

Feb. 17, 1925.

P. FLITNER 1,526,330

STEERING GEAR FOR MOTOR POWER TRUCKS

Filed June 5, 1924

Witness:
a. a. Brand

Inventor
Paul Flitner
By
Jones, Addington, Ames & Seibold
Attys.

Patented Feb. 17, 1925.

1,526,330

UNITED STATES PATENT OFFICE.

PAUL FLITNER, OF LEIPZIG, GERMANY, ASSIGNOR TO ADOLF BLEICHERT & COMPANY, OF LEIPZIG-GOHLIS, GERMANY.

STEERING GEAR FOR MOTOR-POWER TRUCKS.

Application filed June 5, 1924. Serial No. 718,036.

*To all whom it may concern:*

Be it known that I, PAUL FLITNER, residing at Leipzig, Germany, have invented certain new and useful Improvements in Steering Gears for Motor-Power Trucks, of which the following is a specification.

My invention relates to trucks which are known as transport trucks, or more particularly as electric trucks, and which are utilized to transport baggage or like material. These trucks usually comprise a body and are provided with a portion whereupon an operator may stand and steer the same.

There are many difficulties involved in the steering of such trucks, because they are usually directed by a hand-lever, either by means of a lever which is arranged vertically of the driver's or operator's stand and which may be deflected laterally; or, by means of a lever which is arranged horizontally of the operator's position and which is raised and lowered in order to make left and right-hand turns. Even when such hand levers are quite long there is a great deal of exertion necessitated on the part of the operator, especially for the maximum deflection of a lever; that is, when the smallest curves are negotiated. At the same time the long dimension which the lever must have in order to effect the turning movement is a disadvantage because it spreads the operating area over a large extent and renders it difficult to keep the mechanism compact. Again, the use of a long lever appreciably affects the ease of control which the operator has over his vehicle, and it is, of course, highly necessary that easy and complete control be had over the vehicle at the times when the above curves are being negotiated.

In the case of steering gear wherein laterally deflected levers are used, these latter frequently protrude beyond the area of passage of the truck and thereby constitute a considerable element of risk and damage, as well as of personal injury to the driver, because at the very points where the levers are prone to swing beyond the passage area the available space is generally quite restricted. It is difficult, therefore, to properly negotiate traffic of such vehicles with levers of the above character. Moreover, the working conditions of the operators of such vehicle are quite unsatisfactory. In connection with this latter phase of the matter, it is obvious that when the driver or operator takes the position that he must, in order to properly steer the vehicle to the best advantage, the clear view of the profile of the vehicle will be prevented and this naturally constitutes another source of danger of collisions and consequent damage.

On the other hand, when in order to avoid the difficulties inherent in a horizontally deflectable lever vertically actuated levers are used in steering the above trucks, there is a particular disadvantage in that the desired conformity in respective directions of movement, between the lever actuation and the traveling direction of the truck, will be lacking. It has, therefore, been more usual to use the former type of actuation, that is, the actuation of the hand-lever in a horizontal plane, even though this latter type of control contributes markedly to all of the above disadvantages.

Further disadvantages which are present when the horizontally actuated type of lever is utilized occur, for example, when the truck is loaded to such a height that the forward view of the operator is blocked. Under such conditions it is necessary that the operator turn about and reverse the traveling direction of the truck, whereby he will face in a direction where he may have a clear view of the route. However, on the types of truck heretofore used such a reversal in the position of the drive only serves to raise additional disadvantages.

If the truck is equipped with a vertically actuated steering lever, the latter must be so arranged that the driver can grasp the same and actuate it even though he is standing in a reversed position, and this, of course, is a highly improbable arrangement. On the other hand, if the lever is horizontally actuated, although the operator may carry out the two actions of grasping and actuating said lever, it is obvious that his reversed position will be the cause of considerable difficulty in operation.

In consequence of the forces of inertia which act on the operator when the speed of travel of the truck varies and especially in consequence of the centrifugal force which comes into play when curves are negotiated, he will endeavor to balance himself by pulling more on the hand-levers, and this will involuntarily affect the steering. It may also be mentioned that one of the particular disadvantages or reversing position and attempting to steer with a horizontally actuated lever occurs when it is necessary to run the truck onto the narrow platform of an elevator, in which case it is impossible, of course, to allow the hand-lever to project over the side and it has, therefore, been necessary, in order to insure that trucks may be properly steered under the latter circumstances, to eliminate the possibility of the lever extension by certain quite complicated arrangements.

As just indicated, the steering of trucks having hand-levers, is particularly difficult during the negotiation of curves, since during this time the operator does not have a firm hold on the levers and the movement of the truck tends to throw him to one side. This tendency is especially noticed at the sharpest curves and these, of course, are the very ones at which he should have the truck under the firm control and must have a very firm foothold.

My invention provides for the elimination of the above difficulties by utilizing a movable platform upon which the truck operator stands and to which he instinctively gives a motion in the direction in which he wishes to travel, especially when the curves are negotiated.

Figure 2:
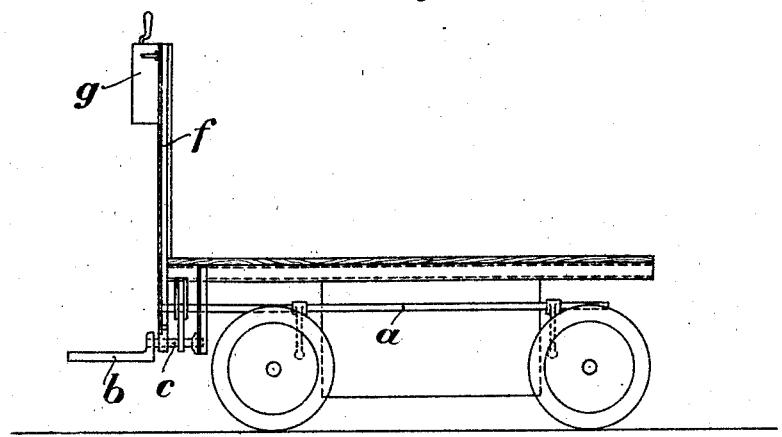

For a better understanding of my invention, reference may be had to the accompanying drawing in which:

Figure 1 is an elevational view of the platform end of a truck embodying my invention; and, Figure 2 is a side elevational view of the same truck.

In the drawing, the truck is provided with a rod $a$ which actuates the steering mechanism of the wheels. The operator stands upon a platform $b$, which latter is pivotally mounted to swing about a supporting member $c$, the axis of movement of said platform $b$ being longitudinal of the truck body.

The steering mechanism represented by the rod $a$ and the platform represented at $b$ are connected in any desired manner; I having diagrammatically shown a connecting bar $d$ as providing for the desired connection between these two elements. It will be apparent, that when the operator pushes downwardly upon the right side (see Figure 1) of the movable platform, he will move the platform $b$ around the axis $c$ in such manner as to cause the truck to steer to the right; and the reverse is true when the pressure is upon the side of the platform $b$ which is to the left of the point $c$.

The usual handhold $e$ and control box $g$ are mounted in proximity to the driver's hands and this arrangement, whereby the vehicle may be steered from the movable platform, results in the driver always being able to hold on firmly at $e$ and to control the speed of the car, even when moving around curves, through the control box.

Many advantages are realized by the utilization of my movable platform in order to steer trucks of the above character. In the first place, the operator can easily take the sharpest curves necessary because the assumption of the proper position of his body will automatically cause his weight to exercise the power necessary to steer the vehicle. Inasmuch, moreover, as the steering hand-lever is dispensed with there is no possibility of projection of the lever beyond the area of the passage of the truck, which feature makes a truck provided with my invention of special advantage for running onto elevators.

Since the steering mechanism in my improved truck is so arranged that pressing downwardly on the right-hand side of the platform corresponds to a course of the truck to the right and pressing downwardly on the left-hand side corresponds to a course to the left, a very desirable conformity in motion and instinctive body pressure is maintained.

In accordance with my invention, the proper reversed position of the driver on the truck will always be possible since the steering in no way depends upon the manipulation of a hand-lever and, moreover, the omission of such a hand-lever permits the driver to keep one hand free for a permanent firm hold on the fixed grip $e$. In trucks provided with my improved steering gear, the actuation of said gear by movement of the operator's platform makes it essential that the operator have a good foothold in order to resist the effect of centrifugal force when taking the sharpest curves and it is, therefore, natural that he stand astraddle the central line of the truck with his legs firmly fixed on the platform in order to effect the steering, it being obvious that the further from the center the feet are fixed the more easily it will be to move the steering mechanism.

Again, when the platform takes up a slanting position, upon going around curves, the operator's position will be natural and he will be instinctively supported whereby he will not be thrown off; in other words, he will be able "to bank" his supporting platform in accordance with the sharpness of the curve which he is negotiating. In this latter connection, as I have pointed out in the claims, the steering of a vehicle provided with my invention is the instinctive result of the position assumed by the body when the curves are negotiated, and this contributes to the marked advantages resident in such invention.

While I have described but one embodiment of my invention, it is obvious that many modifications therein may occur to those skilled in the art and I desire, therefore, that the same be limited only by the scope of the appended claims or the prior art.

Having thus described my invention, what I claim as new and desire to secure by Letters Patent of the United States is:

1. In a vehicle, steering mechanism, a platform upon which an operator may stand to drive and steer said vehicle, said platform being movable, and means connecting the platform and steering mechanism whereby said vehicle may be steered by the movement of said platform.

2. In a vehicle, steering mechanism, a platform upon which an operator may stand to drive and steer said vehicle, said platform being movable about an axis longitudinal of the vehicle, and means connecting the platform and steering mechanism whereby said vehicle may be steered by the movement of said platform.

3. In a power driven vehicle, a burden-carrying body, an operator's platform extending from said body, said platform being movably supported on said body, and steering means for said vehicle actuated by the movement of said platform.

4. In a power driven vehicle, a burden-carrying body, an operator's platform extending from said body, said platform being pivotally supported on said body about an axis longitudinal of said body, and steering mechanism actuated by the movement of said platform.

5. In a power driven vehicle, a burden-carrying body, an operator's platform extending from said body, and upon which the operator may normally stand astraddle the center line of said vehicle, steering mechanism for said vehicle, and means connecting said platform and mechanism for permitting the steering of said vehicle by the feet of said operator.

In testimony whereof I affix my signature in presence of two witnesses.

PAUL FLITNER.

Witnesses:
  RUDOLPH FRICKE,
  WILLY STIER.